United States Patent
Scheifler

(12) 
(10) Patent No.: US 6,282,652 B1
(45) Date of Patent: *Aug. 28, 2001

(54) SYSTEM FOR SEPARATELY DESIGNATING SECURITY REQUIREMENTS FOR METHODS INVOKED ON A COMPUTER

(75) Inventor: Robert W. Scheifler, Somerville, MA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 3 days.

(21) Appl. No.: 09/044,837

(22) Filed: Mar. 20, 1998

Related U.S. Application Data

(60) Provisional application No. 60/076,048, filed on Feb. 26, 1998.

(51) Int. Cl.[7] ............................... G06F 11/30; H04L 9/00
(52) U.S. Cl. ............................................. 713/200; 713/201
(58) Field of Search ................................... 713/200, 201; 709/225, 229

(56) References Cited

U.S. PATENT DOCUMENTS

| | | |
|---|---|---|
| 4,491,946 | 1/1985 | Kryskow, Jr. et al. . |
| 4,713,806 | 12/1987 | Oberlander et al. . |
| 4,809,160 | 2/1989 | Mahon et al. . |
| 4,823,122 | 4/1989 | Mann et al. . |
| 4,939,638 | 7/1990 | Stephenson et al. . |
| 4,956,773 | 9/1990 | Saito et al. . |
| 5,088,036 | 2/1992 | Ellis et al. ............................ 395/425 |
| 5,109,486 | 4/1992 | Seymour . |

(List continued on next page.)

FOREIGN PATENT DOCUMENTS

| | | |
|---|---|---|
| 0 635 792 A3 | 6/1994 | (DE) .......................................... 95/4 |
| 0 300516 A2 | 1/1989 | (EP) . |
| 0 351 536 A3 | 1/1990 | (EP) . |
| 0 384 339 A3 | 8/1990 | (EP) . |
| 0 472 874 A1 | 3/1992 | (EP) . |
| 0 474 340 A2 | 3/1992 | (EP) . |

(List continued on next page.)

OTHER PUBLICATIONS

Birrell et al., "Implementing Remote Procedure Calls," ACM Transactions on Computer Systems, vol. 2, No. 1, Feb. 1984, pp. 39–59.

Emms, Judy; "A Definition of an Access Control Systems Language"; 8202 Computer Standards & Interfaces 6 (1987) No. 4, Amsterdam, The Netherlands; pp. 443–454.

Mullender, *Distributed Systems,* Second Edition, Addison–Wesley, 1993.

(List continued on next page.)

*Primary Examiner*—Dieu-Minh T. Le
*Assistant Examiner*—C. Curtis
(74) *Attorney, Agent, or Firm*—Finnegan, Henderson, Farabow, Garrett & Dunner, L.L.P.

(57) ABSTRACT

A system separately designates security requirements for each of a plurality of methods invoked on a server. The system includes a security class library and an execution unit. The security class library stores a plurality of security objects that correspond to the plurality of methods. Each of the security objects stores the security requirements for the corresponding method. The execution unit receives from a client a method invocation request that includes security requirements of the client. From the request, the execution unit identifies one of the security objects in the security class library that corresponds to the requested method, and determines whether to invoke the requested method based on a comparison of the client security requirements and the security requirements stored in the security object.

18 Claims, 8 Drawing Sheets

U.S. PATENT DOCUMENTS

| | | | |
|---|---|---|---|
| 5,187,787 | 2/1993 | Skeen et al. ............... | 395/600 |
| 5,218,699 | 6/1993 | Brandle et al. . | |
| 5,257,369 | 10/1993 | Skeen et al. ............... | 395/650 |
| 5,293,614 | 3/1994 | Ferguson et al. ............ | 395/600 |
| 5,297,283 | 3/1994 | Kelly, Jr. et al. . | |
| 5,311,591 | 5/1994 | Fischer . | |
| 5,339,435 | 8/1994 | Lubkin et al. . | |
| 5,386,568 | 1/1995 | Wold et al. . | |
| 5,390,328 | 2/1995 | Frey et al. . | |
| 5,423,042 | 6/1995 | Jalili et al. . | |
| 5,440,744 | 8/1995 | Jacobson et al. . | |
| 5,448,740 | 9/1995 | Kiri et al. . | |
| 5,455,952 | 10/1995 | Gjovaag . | |
| 5,471,629 | 11/1995 | Risch . | |
| 5,475,792 | 12/1995 | Stanford et al. . | |
| 5,475,817 | 12/1995 | Waldo et al. . | |
| 5,482,721 | 1/1996 | Serlet et al. . | |
| 5,504,921 | 4/1996 | Dev et al. . | |
| 5,511,197 | 4/1996 | Hill et al. . | |
| 5,524,244 | 6/1996 | Robinson et al. . | |
| 5,553,282 | 9/1996 | Parrish et al. . | |
| 5,555,367 | 9/1996 | Premerlani et al. . | |
| 5,557,798 | 9/1996 | Skeen et al. ............... | 395/650 |
| 5,560,003 | 9/1996 | Nilsen et al. .............. | 395/600 |
| 5,561,785 | 10/1996 | Blandy et al. ............. | 395/497.01 |
| 5,577,231 | 11/1996 | Scalzii et al. . | |
| 5,603,031 | 2/1997 | White et al. ............... | 395/683 |
| 5,617,537 | 4/1997 | Yamada et al. . | |
| 5,628,005 | 5/1997 | Hurvig . | |
| 5,640,564 | 6/1997 | Hamilton et al. . | |
| 5,652,888 | 7/1997 | Burgess . | |
| 5,655,148 | 8/1997 | Richman et al. ............ | 395/828 |
| 5,659,751 | 8/1997 | Heninger ................... | 395/685 |
| 5,671,225 | 9/1997 | Hooper et al. . | |
| 5,675,796 | 10/1997 | Hodges et al. . | |
| 5,680,573 | 10/1997 | Rubin et al. . | |
| 5,680,617 | 10/1997 | Gough et al. . | |
| 5,684,955 | 11/1997 | Meyer et al. . | |
| 5,689,709 | 11/1997 | Corbett et al. . | |
| 5,706,435 | 1/1998 | Barbarà et al. . | |
| 5,724,588 | 3/1998 | Hill et al. . | |
| 5,727,145 | 3/1998 | Nessett et al. . | |
| 5,935,249 * | 8/1999 | Stern et al. ............... | 713/201 |

FOREIGN PATENT DOCUMENTS

| | | | |
|---|---|---|---|
| 0 555 997 A2 | 8/1993 | (EP) . | |
| 0 565 849 A2 | 10/1993 | (EP) . | |
| 0 569 195 A3 | 11/1993 | (EP) . | |
| 0 625 750 A2 | 11/1994 | (EP) . | |
| 0 651 328 A1 | 5/1995 | (EP) . | |
| 0 660 231 A2 | 6/1995 | (EP) . | |
| 0 697 655 A2 | 2/1996 | (EP) . | |
| 0 718 761 A1 | 6/1996 | (EP) . | |
| 0 767 432 A2 | 4/1997 | (EP) . | |
| 0 778 520 A2 | 6/1997 | (EP) . | |
| 0 794 493 A2 | 9/1997 | (EP) . | |
| 0 803 810 A2 | 10/1997 | (EP) . | |
| 0 803 811 A | 10/1997 | (EP) . | |
| 0 805 393 A2 | 11/1997 | (EP) . | |
| 0 810 524 A | 12/1997 | (EP) . | |
| 0 817 020 A1 | 1/1998 | (EP) . | |
| 0 817 022 A2 | 1/1998 | (EP) . | |
| 0 817 025 A | 1/1998 | (EP) . | |
| 253 079 A | 8/1992 | (GB) . | |
| 262 825 A | 6/1993 | (GB) . | |
| 305 087 A | 3/1997 | (GB) . | |
| WO 92/07335 A1 | 4/1992 | (WO) . | |
| WO 92/09948 A1 | 6/1992 | (WO) . | |
| WO 94/03855 A1 | 2/1994 | (WO) . | |
| WO 96/03692 A1 | 2/1996 | (WO) . | |
| WO 96/10787 A1 | 4/1996 | (WO) . | |
| WO96/18947 A1 | 6/1996 | (WO) . | |
| WO96/24099 A1 | 8/1996 | (WO) . | |
| WO98/02814 A1 | 1/1998 | (WO) . | |
| WO 98/04971 | 2/1998 | (WO) ............... | 395/680 |

OTHER PUBLICATIONS

Howard et al., Scale and Performance in a Distributed File System, ACM Transactions on Computer Systems, vol. 6, No. 1, Feb. 1988, pp. 51–81.

Cardelli, *Obliq, A lightweight language for network objects,* Nov. 5, 1993, pp. 1–37.

Dijkstra, Self–stabilizing Systems in Spite of Distributed Control, Communications of the ACM, vol. 17, No. 11, Nov. 1974, pp. 643–644.

Ousterhout et al., The Sprite Network Operating System, Computer, IEEE, Feb. 1988, pp. 23–36.

Dourish, A Divergence–Based Model of Synchrony and Distribution in Collaborative Systems, Xerox Technical Report EPC–1994–102, 1994, pp. 1–10.

Sharrott et al., ObjectMap: Integrating High Performance Resources into a Distributed Object–oriented Environment, ICODP, 1995.

Birrell et al., Grapevine: An Exercise in Distributed Computing, Communications of the ACM, vol. 25, No. 4, Apr. 1982, pp. 260–274.

*Transparent Network Computing,* Locus Computing Corporation, Jan. 5, 1995.

Gray et al., Leases: An Efficient Fault–Tolerant Mechanism for Distributed File Cache Consistency, ACM, 1989, pp. 202–210.

Lamport et al., The Byzantine Generals Problem, ACM Transactions on Programming Languages and Systems, vol. 4, No. 3, Jul. 1982, pp. 382–401.

Dolev et al., On the Minimal Synchronism Needed for Distributed Consensus, Journal of the ACM, vol. 34, No. 1, Jan. 1987, pp. 77–97.

Mummert et al., Long Term Distributed File Reference Tracing: Implementation and Experience, Carnegie Mellon University School of Computer Science, Nov. 1994, pp. 1–28.

Gelernter et al., *Parallel Programming in Linda,* Yale University, Jan. 1985, pp. 1–21.

Cannon et al., Adding Fault–Tolerant Transaction Processing to LINDA, Software–Practice and Experience, vol. 24(5), May 1994, pp. 449–466.

Kambhatla et al., Recovery with Limited Replay: Fault–Tolerant Processes in Linda, Oregon Graduate Institute, Technical Report CS/E 90–019, Sep. 1990, pp. 1–16.

Anderson et al., Persistent Linda: Linda + Transactions + Query Processing, Proceedings of the 13th Symposium on Fault Tolerant Systems, 1994, pp. 93–109.

Gelernter, Generative Communication in Linda, ACM Transactions on Programming Languages and Systems, vol. 7, No. 1, Jan. 1985, pp. 80–112.

Carriero et al., Distributed Data Structures in Linda, Principals of Programming Language, 1986, pp. 1–16.

Jaworski, "Java 1.1 Developer's Guide," 2nd Ed., 1997, Sams.net Publishing.

T. Lindholm et al., "The Java Virtual Machine Specification," Addison Wesley, 1996.

R. Jones et al., "Garbage Collection, Algorithms For Automatic Dynamic Memory Management," 1996.

Pinakis, Using Linda as the Basis of an Operating System Microkernel, University of Western Australia, Department of Computer Science, Aug. 1993, pp. 1–165.

LINDA Database Search, Jul. 20, 1995, pp. 1–68.

Carriero et al, Distributed Data Structures in Linda, Yale Research Report YALEU/DCS/RR–438, Nov. 1985, pp. 1–16.

Agha et al., Actorspaces: An Open Distributed Programming Paradigm, University of Illinois, Report No. UIUCDCS–R–92–1766, Open Systems Laboratory TR No. 8, Nov. 1992, pp. 1–12.

Ahmed et al., A Program Building Tool for Parallel Applications, Yale University, Dec. 1, 1993, pp. 1–23.

Liskov et al., Distributed Object Management in Thor, International Workshop on Distributed Object Management, 1992.

Coulouris et al., *Distributed Systems Concepts and Designs,* Second Edition, Addison–Wesley, 1994.

Birrell et al., Network Objects, DEC SRC Research Report 115, Feb. 28, 1994.

Birrell et al., Distributed Garbage Collection for Network Objects, DEC SRC Research Report 116, Dec. 15, 1993.

Wollrath et al., A Distributed Object Model for the JAVA™ System, USENIX Association, Conference on Object–Oriented Technologies and Systems, Jun. 17–21, 1996, pp. 219–231.

Harris et al., Proposal for a General Java Proxy Class for Distributed Systems and Other Uses, Netscape Communications Corp., Jun. 25, 1997.

Hamilton, Java and the Shift to Net–Centric Computing, Computer, Aug. 1996, pp. 31–39.

Chung et al., A "Tiny" Pascal Compiler: Part 1: The P–Code Interpreter, BYTE Publications, Inc., Sep. 1978.

Chung et al., A "Tiny" Pascal Compiler: Part 2: The P–Compiler, BYTE Publications, Inc., Oct. 1978.

Thompson, Regular Expression Search Algorithm, Communications of the ACM, vol. II, No. 6, Jun. 1968, pp. 419–422.

Mitchell et al., *Mesa Language Manual,* Xerox Corporation, pp. 1–150.

McDaniel, *An Analysis of a Mesa Instruction Set,* Xerox Corporation, May 1982, pp. 1–17.

Pier, A Retrospective on the Dorado, A High–Performance Personal Computer, Xerox Corporation, Aug. 1983, pp. 1–40.

Pier, A Retrospective on the Dorado, A High–Performance Personal Computer, IEEE Conference Proceedings, The 10th Annual International Symposium on Computer Architecture, 1983, pp. 252–269.

Krasner, The Smalltalk–80 Virtual Machine, BYTE Publications Inc., Aug. 1991, pp. 300–320.

Birrell et al., Network Objects, Operating Systems Review, ACM Press, vol. 27, No. 5, Dec. 1993, pp. 217–230.

Remote Method Invocation Specification, Sun Microsystems, Inc., (1997), http://java.sun.com/products/jdk/1.1/docs/guide/rmi/spec/rmiTOC.doc.html.

* cited by examiner

SYSTEM FOR SEPARATELY DESIGNATING SECURITY REQUIREMENTS FOR METHODS INVOKED ON A COMPUTER

RELATED APPLICATIONS

The following identified U.S. patent applications are relied upon and are incorporated by reference in this application.

U.S. patent application entitled "Controlling Access to a Resource," filed on Dec. 11, 1997, and accorded Ser. No. 08/988,431.

U.S. patent application entitled "Protection Domains to Provide Security in a Computer System," filed on Dec. 11, 1997, and accorded Ser. No. 08/988,439.

U.S. patent application entitled "Secure Class Resolution, Loading and Definition," filed on Dec. 11, 1997, and accorded Ser. No. 08/988,660.

U.S. patent application entitled "Typed, Parameterized, and Extensible Access Control Permissions," filed on Dec. 11, 1997, and accorded Ser. No. 08/988,857.

U.S. patent application entitled "Layer-Independent Security for Communication Channels," filed on Jun. 26, 1997, and accorded Ser. No. 08/883,636.

Provisional U.S. Patent Application Ser. No. 60/076,048, entitled "Distributed Computing System," filed on Feb. 26, 1998.

U.S. patent application Ser. No. 09/044,923, entitled "Method and System for Leasing Storage," filed on the same date herewith.

U.S. patent application Ser. No. 09/044,838, entitled "Method, Apparatus, and Product for Leasing of Delegation Certificates in a Distributed System," filed on the same date herewith.

U.S. patent application Ser. No. 09/044,834, entitled "Method, Apparatus and Product for Leasing of Group Membership in a Distributed System," filed on the same date herewith.

U.S. patent application Ser. No. 09/044,916, entitled "Leasing for Failure Detection," filed on the same date herewith.

U.S. patent application Ser. No. 09/144,933 entitled "Method for Transporting Behavior in Event Based System," and filed on the same date herewith.

U.S. patent application Ser. No. 09/044,919, entitled "Deferred Reconstruction of Objects and Remote Loading for Event Notification in a Distributed System," filed on the same date herewith.

U.S. patent application Ser. No. 09/044,938, entitled "Methods and Apparatus for Remote Method Invocation," on the same date herewith.

U.S. patent application Ser. No. 09/045,652, entitled "Method and System for Deterministic Hashes to Identify Remote Methods," filed on the same date herewith.

U.S. patent application Ser. No. 09/044,790, entitled "Method and Apparatus for Determining Status of Remote Objects in a Distributed System," filed on the same date herewith.

U.S. patent application Ser. No. 09/044,930, entitled "Downloadable Smart Proxies for Performing Processing Associated with a Remote Procedure Call in a Distributed System," filed on the same date herewith.

U.S. patent application Ser. No. 09/044,917, entitled "Suspension and Continuation of Remote Methods," filed on the same date herewith.

U.S. patent application Ser. No. 09/044,835, entitled "Method and System for Multi-Entry and Multi-Template Matching in a Database," filed on the same date herewith.

U.S. patent application Ser. No. 09/044,839, entitled "Method and System for In-Place Modifications in a Database," filed on the same date herewith.

U.S. patent application Ser. No. 09/044,945, entitled "Method and System for Typesafe Attribute Matching in a Database," filed on the same date herewith.

U.S. patent application Ser. No. 09/044,931, entitled "Dynamic Lookup Service in a Distributed System," filed on the same date herewith.

U.S. patent application Ser. No. 09/044,939, entitled "Apparatus and Method for Providing Downloadable Code for Use in Communicating with a Device in a Distributed System," filed on the same date herewith.

U.S. patent application Ser. No. 09/044,826, entitled "Method and System for Facilitating Access to a Lookup Service," filed on the same date herewith.

U.S. patent application Ser. No. 09/044,932, entitled "Apparatus and Method for Dynamically Verifying Information in a Distributed System," filed on the same date herewith.

U.S. patent application Ser. No. 09/030,840, entitled "Method and Apparatus for Dynamic Distributed Computing Over a Network," and filed on Feb. 26, 1998.

U.S. patent application Ser. No. 09/044,936, entitled "An Interactive Design Tool for Persistent Shared Memory Spaces," filed on the same date herewith.

U.S. patent application Ser. No. 09/044,934, entitled "Polymorphic Token-Based Control," filed on the same date herewith.

U.S. patent application Ser. No. 07/044,915, entitled "Stack-Based Access Control," filed on the same date herewith.

U.S. patent application Ser. No. 09/044,944, entitled "Stack-Based Security Requirements," filed on the same date herewith.

This is continuing of Provisional Application 60/076,048 filed on Feb. 26, 1998.

BACKGROUND OF THE INVENTION

The present invention is directed to security measures in a computer system and, more particularly, to systems and methods that permit a server to associate independent security requirements with individual remote methods.

Distributed systems usually contain a number of different computers interconnected by communications networks. Oftentimes, a client-server relationship is established between communicating computers. Typically, a "client" is defined as a process making a call to request resources located or controlled by a "server" process. In this context, the computers executing the requesting process and the server process may also be referred to as a client and server, respectively. However, these roles may change depending on the context of information and particular processing taking place.

One mechanism that facilitates the client-server relationship is the Remote Procedure Call (RPC) where the client invokes a function of the server. The RPC is a mechanism that provides synchronized communication between two processes operating on the same or different computers. The RPC mechanism is usually implemented in two parts: one part on the client side and the other part on the server side.

Security is an issue that always arises when client and server computers communicate. A breach in security can severely hamper the operation of both the client's and server's computers. Thus, organizations that use computer systems are vulnerable to persons who may intentionally or unintentionally cause the computer systems to malfunction or who may steal the organizations' confidential information.

System operators typically address three types of security issues: (1) preventing interception and alteration of messages; (2) controlling access to a server; and (3) authenticating a server by a client. System operators have conventionally addressed these issues in object-oriented programming environments by defining a security class that provides methods for setting communication requirements. One such object-oriented programming environment is Sun Microsystems™ Java™ object-oriented programming environment described in a text entitled *Java 1.1 Developer's Guide*, 2nd ed., Sams.net Publishing, 1997, which is hereby incorporated by reference.

The security class includes five communication requirements: CONFIDENTIALITY, INTEGRITY, ANONYMITY, AUTHENTICATE_SERVER, and NO_DELEGATION. CONFIDENTIALITY ensures that message contents are private. System operators use encryption techniques to assure that only parties with the proper decryption key can decipher the message. INTEGRITY detects when message contents (both requests and replies) have been altered, and refuses to process altered messages. System operators may accomplish this through the use of checksums, or the like, at both the client and server locations.

ANONYMITY represents the client desiring to remain anonymous. In other words, the client does not want to be authenticated by the server. AUTHENTICATE_SERVER represents the client needing to authenticate the server before invoking a remote method. Through this communication requirement, the client ensures that it is communicating with the correct server. NO_DELEGATION refers to the server not being permitted to delegate under the client's identity in calls that it makes. In other words, the server is not authorized to make calls to other computer systems pretending to be the client.

At the client's location, the security class is represented by a single bit for each communication requirement. By setting the bits corresponding to CONFIDENTIALITY, INTEGRITY, ANONYMITY, AUTHENTICATE_ SERVER, and NO_DELEGATION, the client designates that confidentiality will be ensured, that integrity will be ensured, that the client will remain anonymous, that the server will be authenticated, and that delegation will not be provided, respectively. Conventionally, a client indicates the security class preferences on a global context or on a per call basis. In other words, the client specifies one set of communication requirements to be used for every call made by the client or specifies separate communication requirements for each individual call to a server.

At the server's location, the security class is represented by dual bits for each communication requirement. One of the bits (the "supported bit") represents whether the corresponding communication requirement is supported by the server. The other bit (the "required bit") represents whether the corresponding communication requirement is required by the server. In other words, the supported bit indicates what the server is capable of doing and the required bit indicates what the server must do.

For CONFIDENTIALITY, when the supported bit is set, the server provides confidentiality when the client requests it. If the bit is not set, the server is unable to provide confidentiality. When the required bit is set, the server will always ensure confidentiality.

For INTEGRITY, when the supported bit is set, the server provides integrity when the client requests it. If the bit is not set, the server is unable to provide integrity. When the required bit is set, the server will always ensure integrity.

For ANONYMITY, when the supported bit is set, the server is willing to accept an anonymous client (ie., the server is willing to not authenticate the client) when the client requests anonymity. Conversely, if the supported bit is not set, the server will always authenticate the client. When the required bit is set, the server will only accept anonymous clients. In other words, the server never authenticates the client when the required bit is set.

For AUTHENTICATE_SERVER, when the supported bit is set, the server is willing to authenticate itself when the client requests it. Conversely, if the supported bit is not set, the server is unable to authenticate itself. A server will never require itself to authenticate, so the required bit is never set.

For NO_DELEGATION, when the supported bit is set, the server is willing to do without delegation. Conversely, if the supported bit is not set, the server always requires delegation. When the required bit is set, the server never needs to delegate.

Conventionally, a server contains a single set of communication requirements that dictate the minimum requirements that the server tolerates. The server designates one set of communication requirements to handle all methods and functions invoked on the server. Typically, however, the methods and functions contain varying sets of requirements that they can tolerate for their invocation. For example, suppose a server contains two methods: a deletion method that requires client authentication and a lookup method that requires no client authentication. The server communication requirements include the strictest communication requirements required by the methods, which in this case would be to always require client authentication.

Such an across-the-board designation of communication requirements leads to an increase in the amount of processing time required to invoke a method, wasting system resources because all methods are subjected to the same communication requirements, even those that do not require such communication requirements. Accordingly, it is desirable to improve security requirement designation in communication systems.

SUMMARY OF THE INVENTION

Systems and methods consistent with the present invention represent an improvement over conventional systems by permitting a server to designate communication requirements on a per-method basis. That is, the server designates a separate set of communication requirements for each method invoked on behalf of a client or another server.

A system consistent with the principles of the present invention separately designates security requirements for each of a plurality of methods invoked on a computer. The system includes a security class library and an execution unit. The security class library stores a plurality of security objects that correspond to the plurality of methods. Each of the security objects stores the security requirements for the corresponding method. The execution unit receives from a client a method invocation request that includes security requirements of the client. From the request, the execution unit identifies one of the security objects in the security class library that corresponds to the requested method, and determines whether to invoke the requested method based on a comparison of the client security requirements and the security requirements stored in the security object.

BRIEF DESCRIPTION OF THE DRAWINGS

The accompanying drawings, which are incorporated in and constitute a part of this specification, illustrate an embodiment of the invention and, together with the description, explain the objects, advantages, and principles of the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the principles of the present invention permit a server to designate a different set of communication requirements for each method that it invokes on behalf of a client or another server. This per-method designation leads to savings in both the processing time required to invoke a requested method and the amount of system resources required for the invocation.

THE DISTRIBUTED SYSTEM

Figure 1:
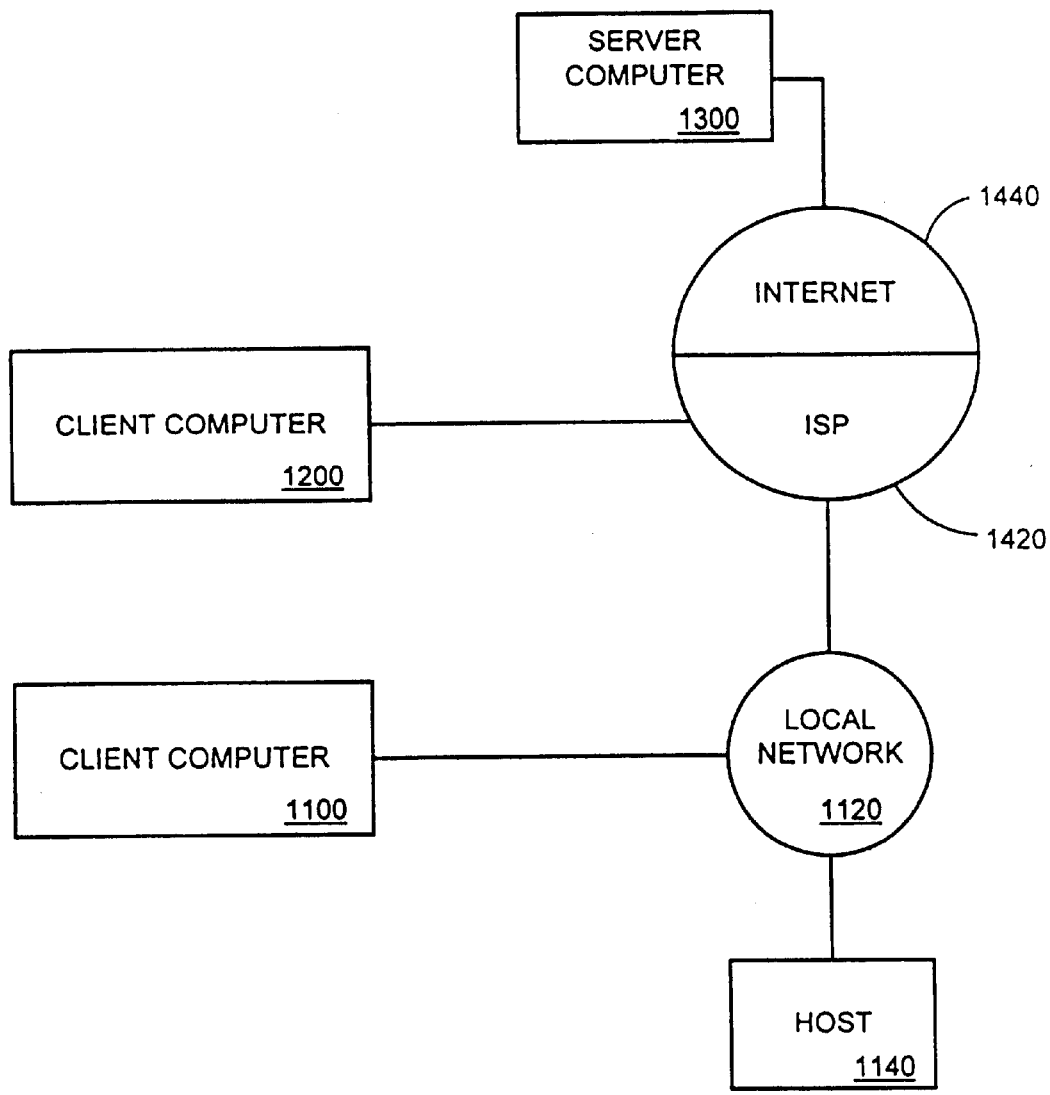
FIG. 1 is a diagram of a computer network suitable for use with systems consistent with the present invention.

FIG. 1 is a diagram of an exemplary computer network 1000 for use with systems consistent with the present invention. Computer network 1000 includes client computers 1100 and 1200 connected to a server computer 1300 via a network. Client computers 1100 and 1200 are conventional client computers that may include, for example, network computers, workstations, personal computers, mainframe computers, and even "dumb" terminals.

Client computer 1100 includes a communication interface that provides two-way data communication coupling to a local network 1120, such as a local area network (LAN). One skilled in the art will appreciate that wireless links may also be used for the coupling. In any such implementation, client computer 1100 sends and receives electrical, electromagnetic, or optical signals that carry data representing various types of information.

Local network 1120 typically provides data communication to other data networks or devices. For example, local network 1120 may provide a connection to a host computer 1140 or to data equipment operated by an Internet Service Provider (ISP) 1420. ISP 1420, in turn, provides data communication services through the Internet 1440. Local network 1120 and Internet 1440 both use electrical, electromagnetic, or optical signals that carry data. The signals through the various networks and the signals which carry the data to and from client computer 1100 are exemplary forms of carrier waves transporting the information.

Client computer 1100 need not connect to Internet 1440 via a local network, but may contain a direct Internet connection to ISP 1420. Client computer 1200 contains just such a connection. This connection may be implemented using a modem or a data connection, such as an Ethernet connection.

Figure 2:
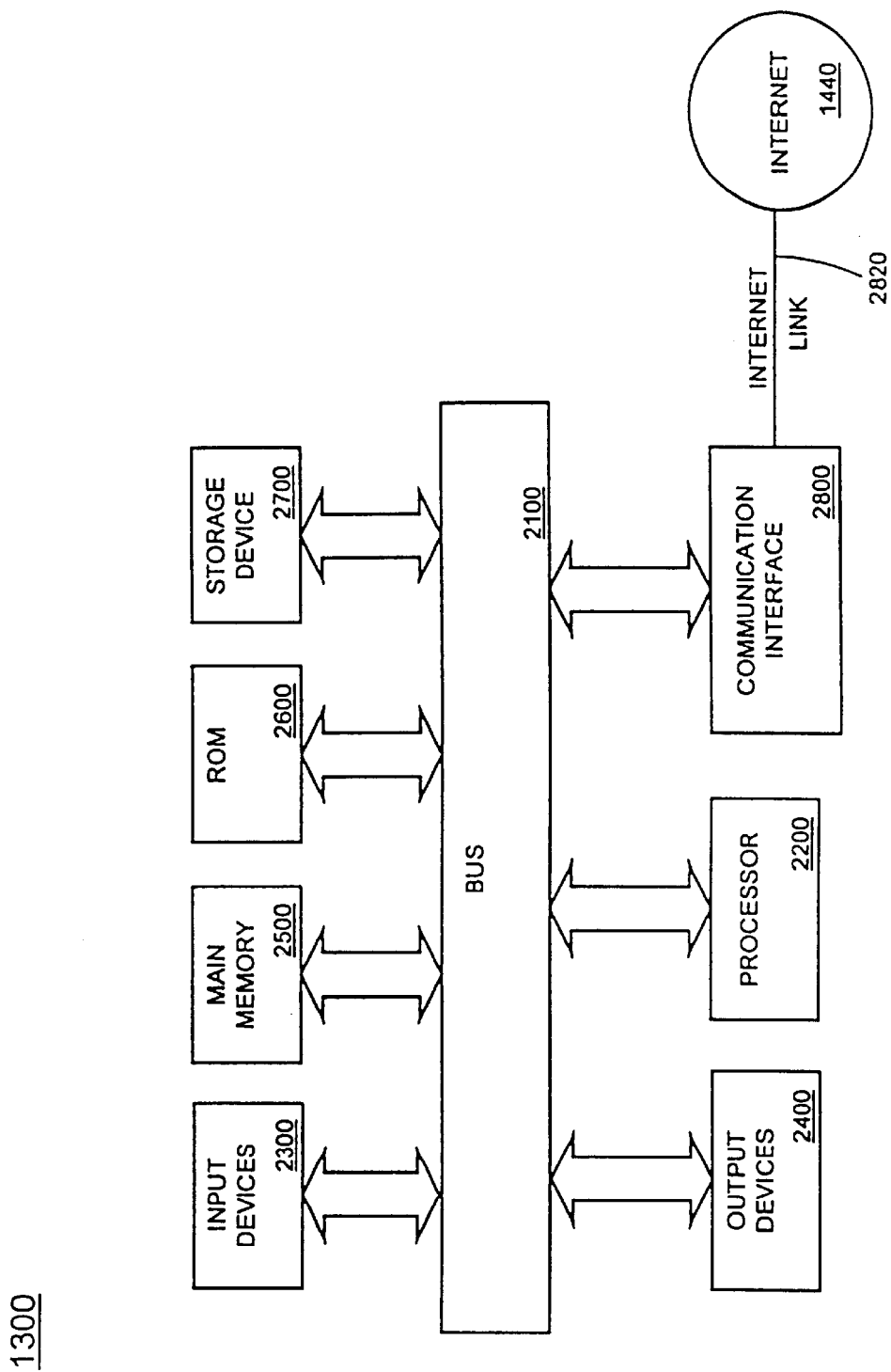
FIG. 2 is a diagram of a server of FIG. 1 in an implementation consistent with the principles of the present invention.

Client computers 1100 and 1200 can send messages and receive data, including program code, through the network (s). When communicating over Internet 1440 or local network 1120, client computers 1100 and 1200 may request such code from or invoke methods and functions on a server computer, such as server computer 1300. FIG. 2 is a diagram of server computer 1300 in an implementation consistent with the principles of the present invention. Client computers 1100 and 1200 may be similarly constructed.

Server computer 1300 includes bus 2100 or another communication mechanism for communicating information, and processor 2200 coupled with bus 2100 for processing information. Processor 2200 may be coupled via bus 2100 to input devices 2300, such as a keyboard, a mouse, a speech recognition mechanism, or a trackball, to permit an operator to input information, and output devices 2400, such as a cathode ray tube (CRT), for displaying information to the operator.

Server computer 1300 also includes main memory 2500, such as a random access memory (RAM) or another type of rewriteable storage device, coupled to bus 2100 for storing information and instructions executed by processor 2200. Main memory 2500 also may be used for storing temporary variables or other intermediate information during execution of instructions by processor 2200. Server computer 1300 further includes read only memory (ROM) 2600 or another type of static storage device coupled to bus 2100 for storing static information and instructions for processor 2200. Storage device 2700, such as a magnetic disk or optical disk, is provided and coupled to bus 2100 for storing information and instructions.

The term "computer-readable medium" as used herein refers to any medium that participates in providing instructions to processor 2200 for execution. Such a medium may take many forms, including but not limited to, non-volatile media, volatile media, and transmission media. Non-volatile media include, for example, optical or magnetic disks, such as storage device 2700. Volatile media include rewriteable memory, such as main memory 2500. Transmission media include coaxial cables, copper wire, and fiber optics, including the wires that comprise bus 2100. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD ROM, any other optical medium, punchcards, papertape, any other physical medium with patterns of holes, a RAM, a PROM, an EPROM, a FLASH EPROM, any other memory chip or cartridge, a carrier wave, or any other medium from which a computer can read.

Various forms of computer readable media may be involved in carrying one or more sequences of one or more instructions to processor 2200 for execution. For example, the instructions may initially be carried on a magnetic disk of a remote computer. The remote computer can load the instructions into its rewriteable memory and send the instructions over a telephone line using a modem.

A modem local to server computer 1300 can receive the data on the telephone line and use an infrared transmitter to convert the data to an infrared signal. An infrared detector coupled to bus 2100 can receive the data carried in the infrared signal and place the data on bus 2100. Bus 2100 carries the data to main memory 2500, from which processor 2200 retrieves and executes the instructions. The instructions received by main memory 2500 may optionally be stored on storage device 2700 either before or after execution by processor 2200.

Server computer 1300 includes communication interface 2800 coupled to bus 2100. Communication interface 2800 provides two-way data communication coupling to Internet 1440 via Internet link 2820. Communication interface 2800 may, alternatively, provide two-way data communication coupling to local network 1120. In any implementation, communication interface 2800 sends and receives electrical, electromagnetic, or optical signals that carry data representing various types of information.

Figure 3:
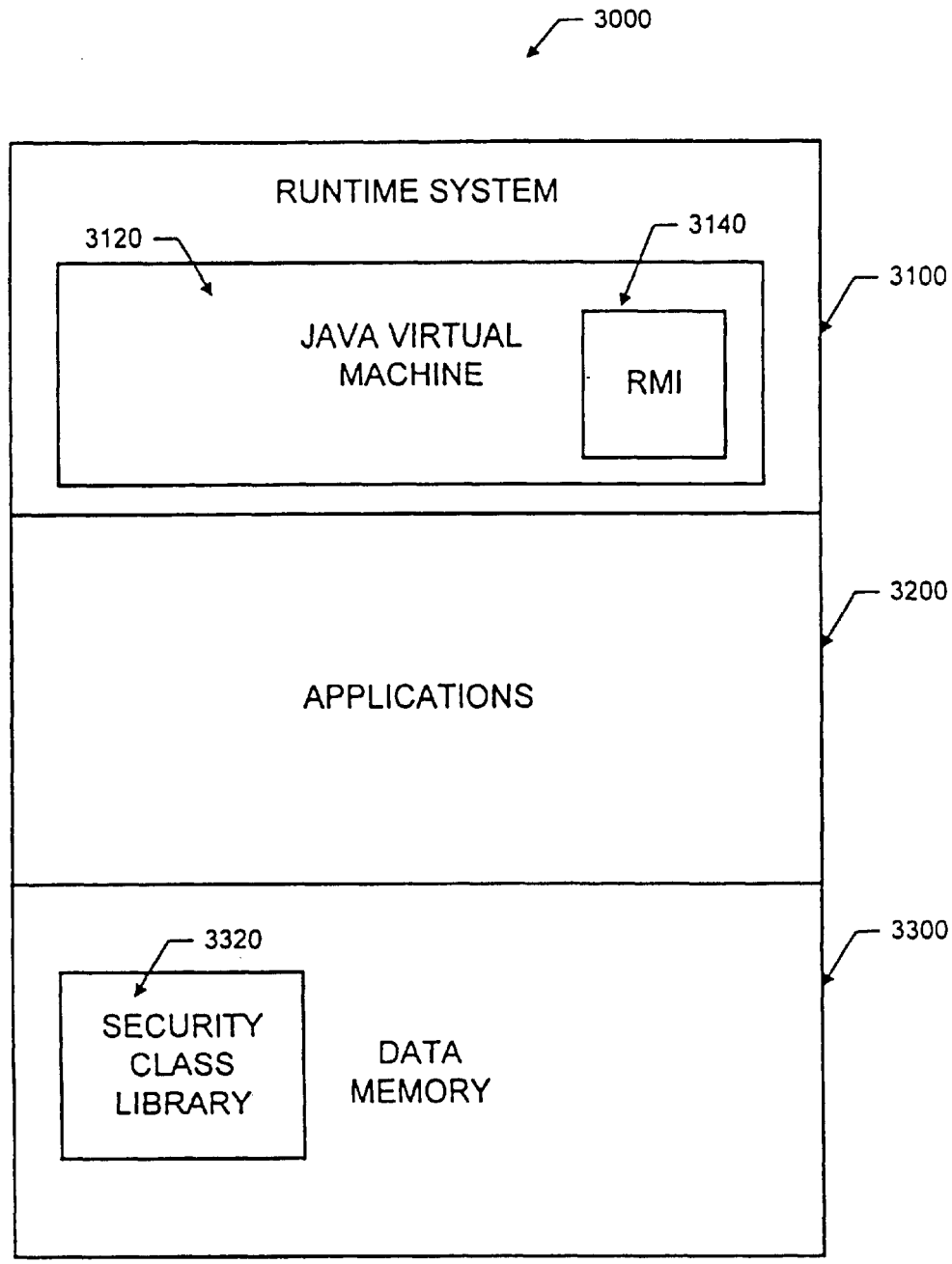
FIG. 3 is a detailed diagram of a memory of FIG. 2.

FIG. 3 is a detailed diagram of memory 3000, which may include main memory 2500 (FIG. 2). Memory 3000 includes JavaT™ runtime system 3100, applications area 3200, and data memory 3300. At the core of Java runtime system 3100 is Java™ Virtual Machine (JVM) 3120. JVM 3120 is a microprocessor implemented in software that runs using the capabilities provided by the operating system and the computer hardware. The JVM is described, for example, in a text entitled *The Java Virtual Machine Specification*, by Tim Lindholm and Frank Yellin, Addison Wesley, 1996, which is hereby incorporated by reference.

JVM 3120 includes Java™ Remote Method Invocation (RMI) 3140. RMI 3140 is an RPC mechanism that responds to calls for invocation of methods stored in applications area 3200. Both RMI 3140 and JVM 3120 are provided as part of the Java™ software development kit available from Sun Microsystems of Mountain View, Calif.

Applications area 3200 includes programs executed by processor 2200 and interpreted by JVM 3120. The programs include object-oriented applets, such as applets of the Java programming language, as well as other object-oriented programs, multiplatform programs, secure programs, distributed networking programs, multithreaded programs, web programs, etc. Some of the programs include methods that are invoked by RMI 3140 at the request of a client, and some of the methods operate on objects and classes stored in data memory 3300. The methods include, for example, storing, deleting, updating, lookup, etc.

Figure 4A:
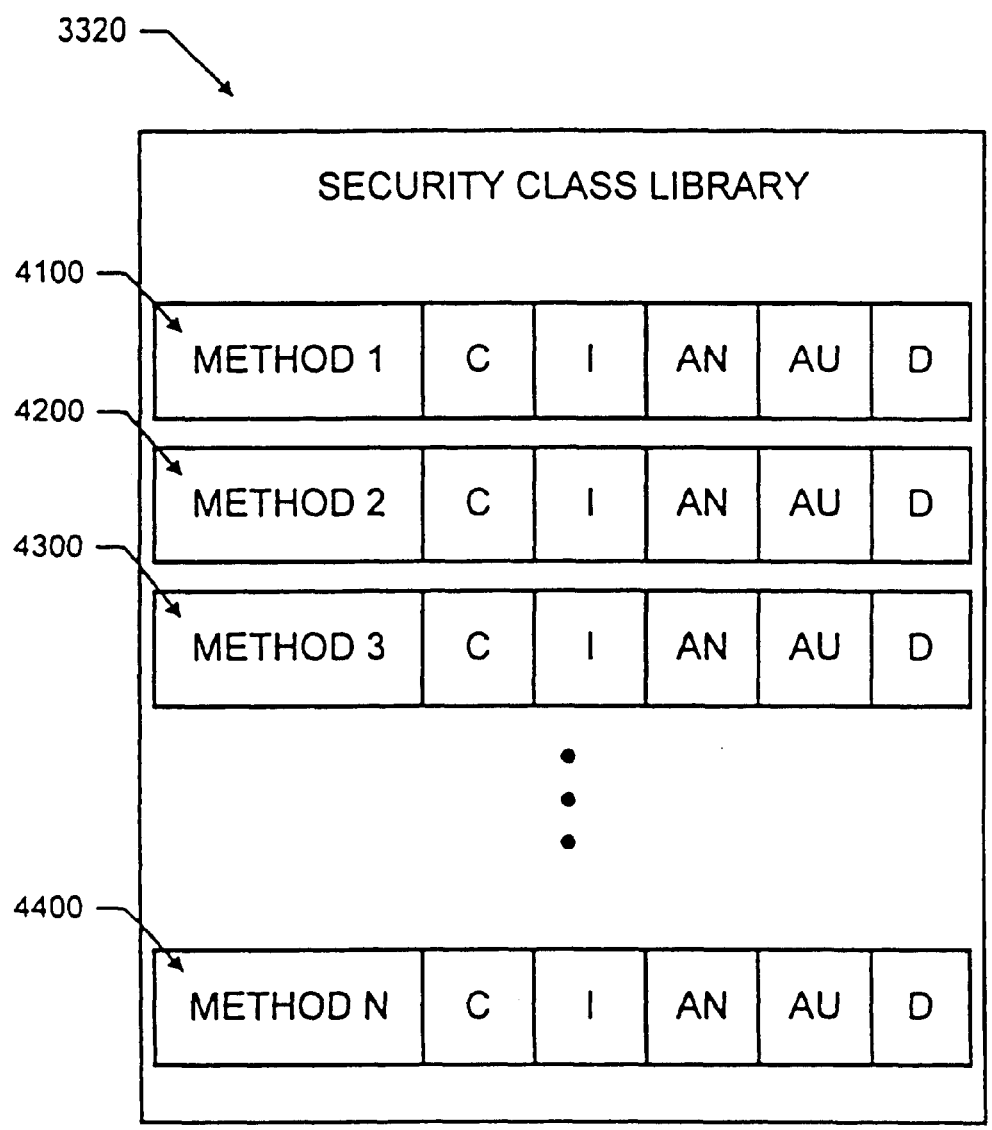
FIG. 4A is a detailed diagram of a security class library of FIG. 3.

Data memory 3300 stores data used by processor 2200 and JVM 3120, and includes security class library 3320. FIG. 4A is a diagram of security class library 3320 in greater detail. Security class library 3320 stores multiple method security objects 4100–4400 that contain the communication requirements required by the identified methods.

Figure 4B:
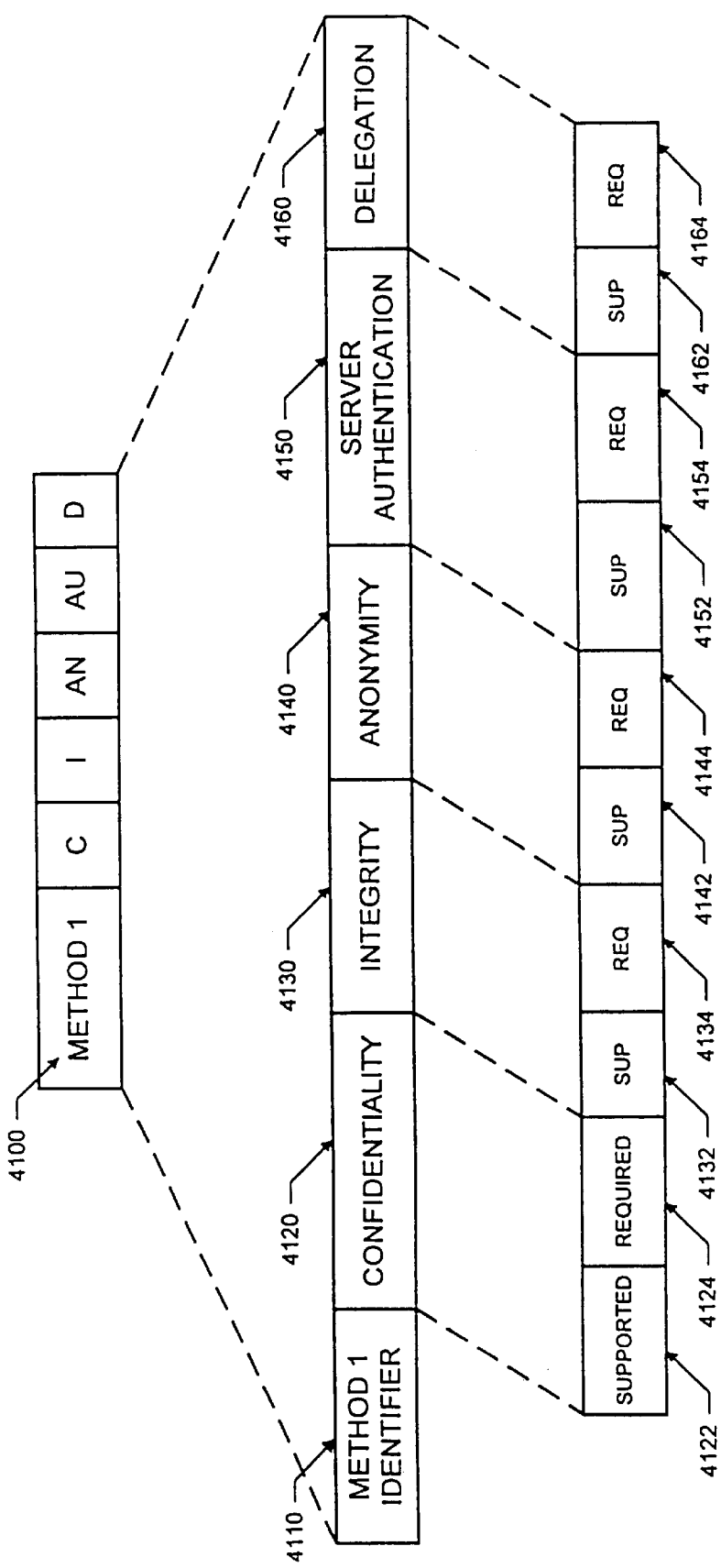
FIG. 4B is a more detailed diagram of a method security object from the security class library of FIG. 4A.

FIG. 4B is a diagram of the contents of method security object 4100 in an implementation consistent with the present invention. Method security object 4100 includes method identifier 4110 and a communication requirements flag, including confidentiality bits 4120, integrity bits 4130, anonymity bits 4140, server authentication bits 4150, and delegation bits 4160.

Method identifier 4110 includes an identification of the corresponding method, such as a pointer to the method in applications area 3200 or a deterministic hashing mechanism described in U.S. patent application Ser. No. 09/045,652, entitled "Method and System for Deterministic Hashes to Identify Remote Methods," previously incorporated by reference.

Confidentiality bits 4120 include supported bit 4122 and required bit 4124 that dictate whether the corresponding method permits or requires the associated communication to be confidential. When a client requests invocation of the method and supported bit 4122 is set, server computer 1300 provides confidentiality when the client requests it. If supported bit 4122 is not set, server computer 1300 is unable to provide confidentiality. On the other hand, if required bit 4124 is set, server computer 1300 will always ensure confidentiality.

Integrity bits 4130 include supported bit 4132 and required bit 4134 that dictate whether the method permits or requires an integrity check in the associated communication. When a client requests invocation of the method and supported bit 4132 is set, server computer 1300 provides integrity when the client requests it. If supported bit 4132 is not set, server computer 1300 is unable to provide integrity. If required bit 4134 is set, on the other hand, server computer 1300 will always ensure integrity.

Anonymity bits 4140 include supported bit 4142 and required bit 4144 that dictate whether the method requires or supports client anonymity. When a client requests invocation of the method and supported bit 4142 is set, server computer 1300 permits anonymity when the client requests it. If supported bit 4142 is not set, server computer 1300 requires authentication of the client. When required bit 4144 is set, server computer 1300 only accepts anonymous clients. In other words, server computer 1300 never authenticates the client when required bit 4144 is set.

Server authentication bits 4150 include supported bit 4152 and required bit 4154 that dictate whether the method supports authentication of server computer 1300 when requested by a client. When the client requests invocation of the method and supported bit 4152 is set, server computer 1300 authenticates itself when the client requests it. If supported bit 4152 is not set, server computer 1300 is unable to authenticate itself. A method will never require server computer 1300 to authenticate itself. Therefore, required bit 4154 will never be set.

Delegation bits 4160 include supported bit 4162 and required bit 4164 that dictate whether server computer 1300 needs to be able to pretend to be the client when server computer 1300 makes calls to other systems. When the client requests invocation of the method and supported bit 4162 is set, server computer 1300 will do without delegation if the client does not permit it. If supported bit 4162 is not set, server computer 1300 will require delegation. If required bit 4164 is set, on the other hand, server computer 1300 will never need to delegate.

SYSTEM PROCESSING

Figure 5B:
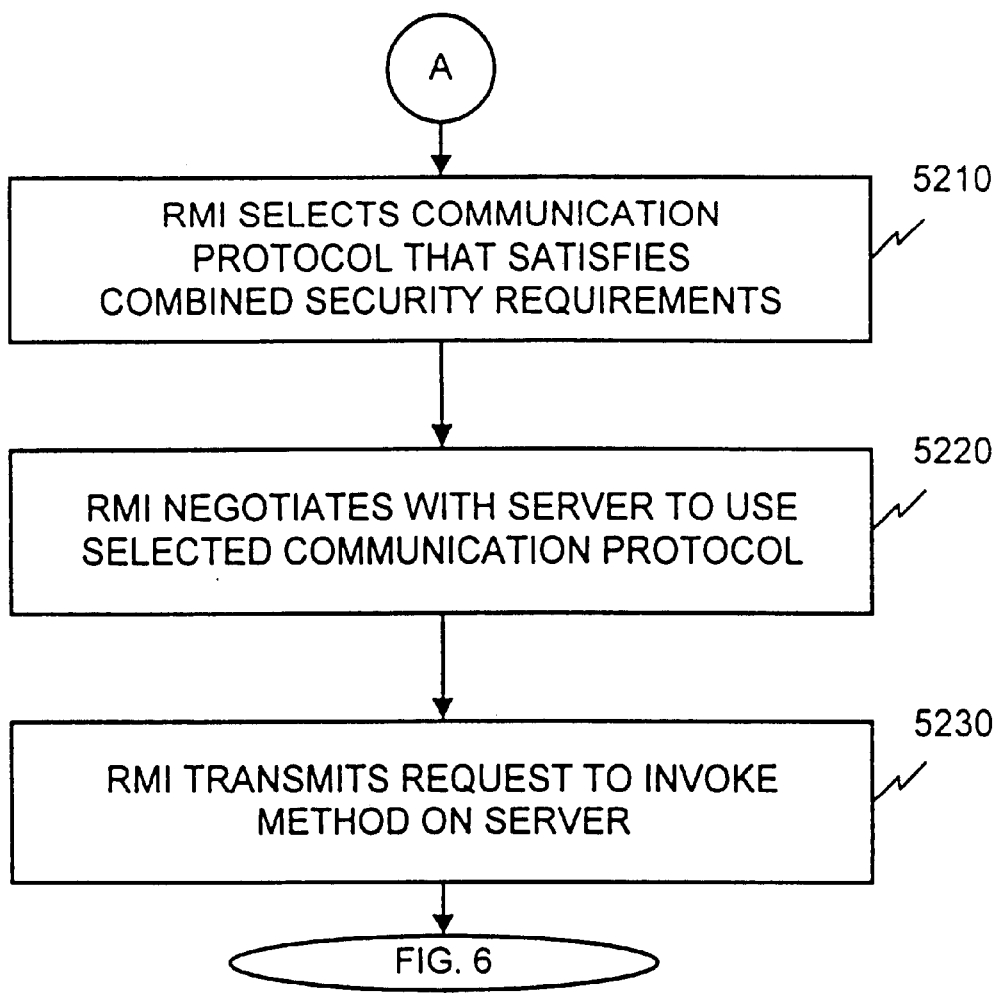
FIGS. 5C and 5B are a flowchart of client processing activity consistent with the principles of the present invention.
Figure 5C:
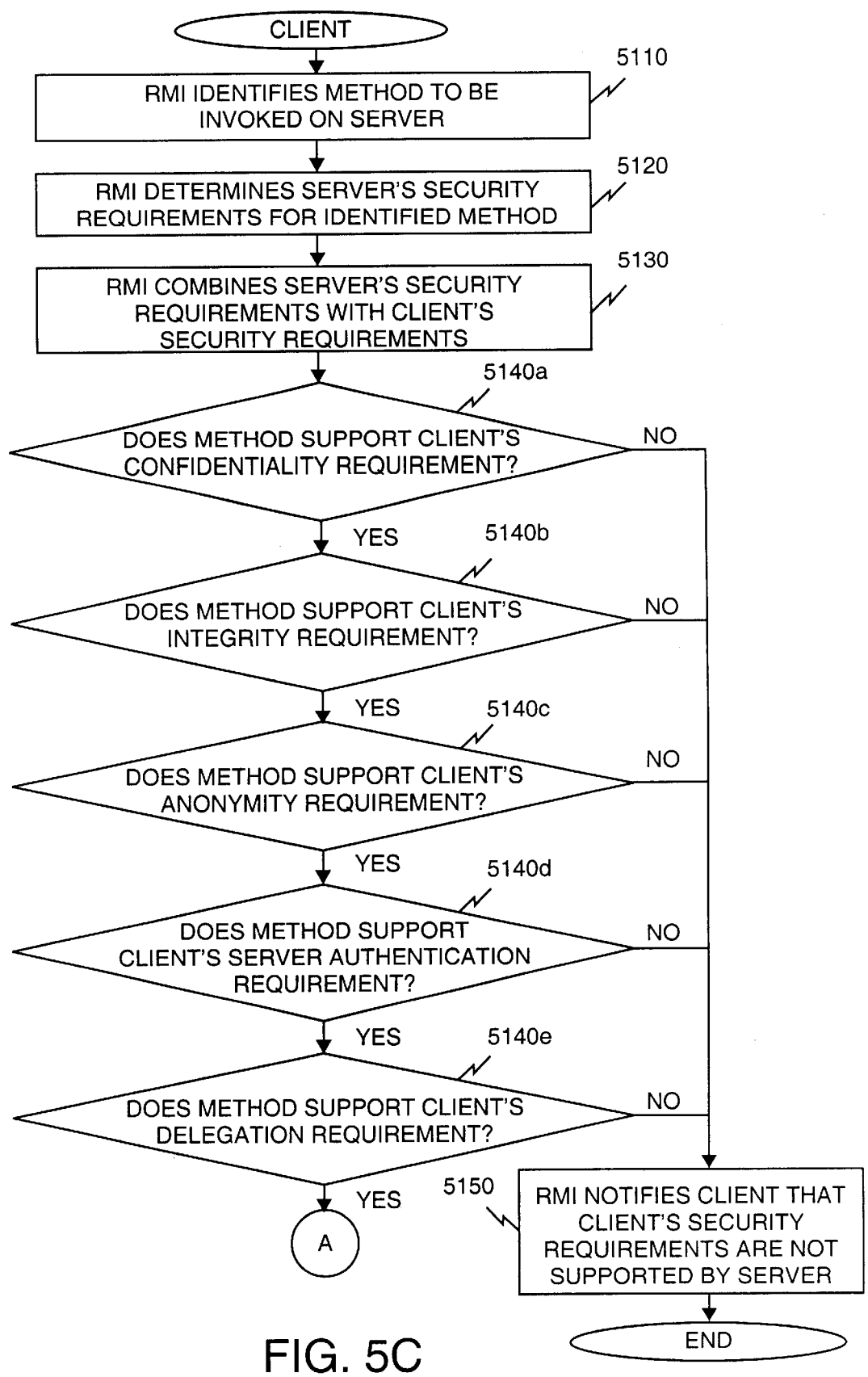
Figure 6:
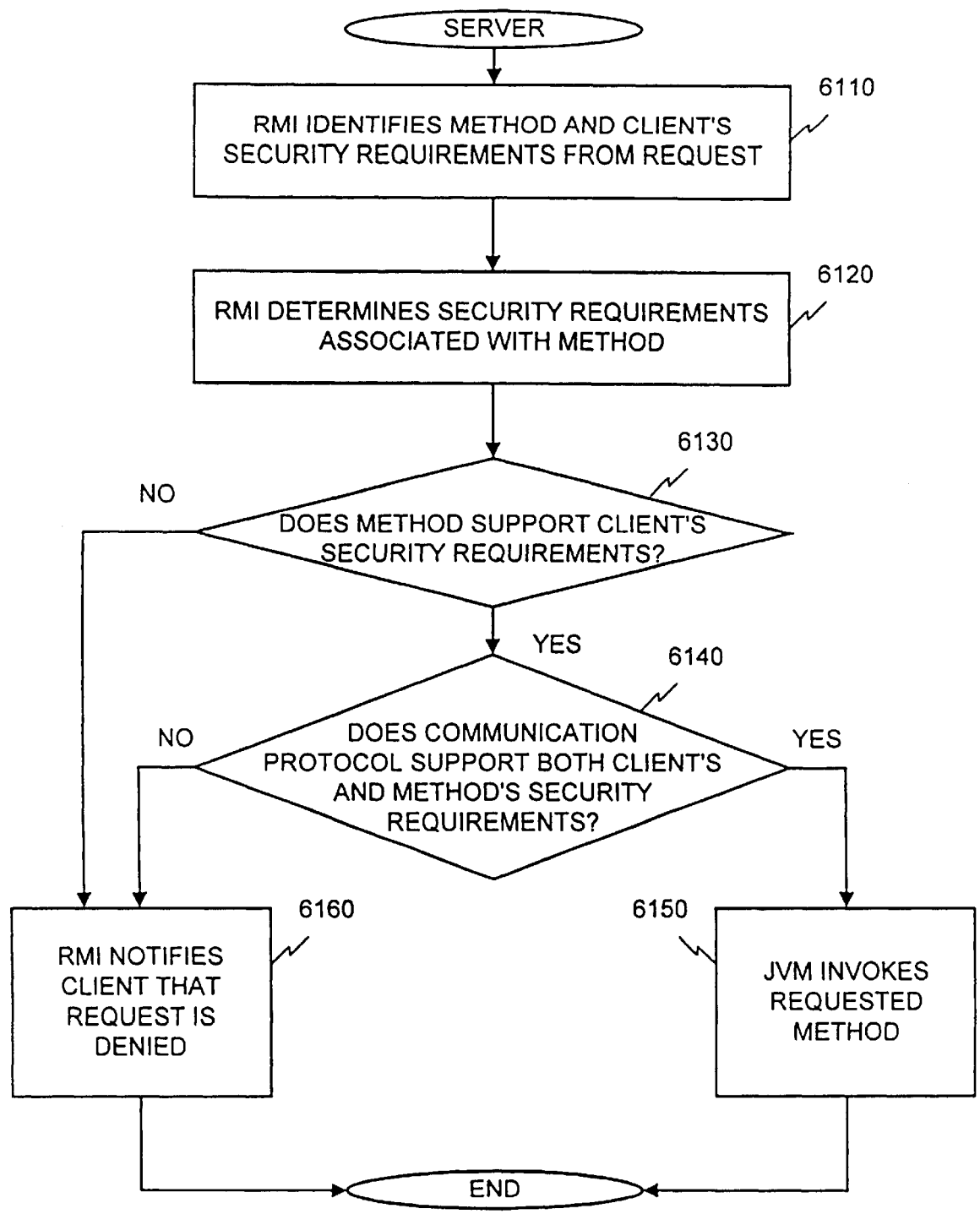
FIG. 6 is a flowchart of server processing activity consistent with the principles of the present invention.

FIGS. 5C, 5B, and 6 are flowcharts of processing that occurs when a client requests access to a function on a server in an implementation consistent with the principles of the present invention. FIGS. 5C and 5B cover processing performed by the client. FIG. 6 covers processing performed by the server.

When a client process, such as a process operating on client computer 1100 (FIG. 1), requests access to a function on a server, such as server computer 1300, the client process invokes the RMI on client computer 1100. The requested access to a function may include a call to invoke a method on server 1300 or a request for some other similar action.

From the client process, the client RMI identifies the method on server 1300 that is to be invoked [step 5110]. The client RMI then determines server 1300's communication requirements for the requested method by retrieving the communication requirements from a copy of server 1300's security class library 3320 that client computer 1100 maintains [step 5120].

The client RMI combines the client process's communication requirements with the communication requirements of the requested method from the copy of server 1300's security class library [step 5130]. The combination results in a set of communication requirements that satisfy both the client process's communication requirements and the communication requirements of the requested method.

The client RMI determines whether the requested method supports the client process's communication requirements [step 5140]. If the requested method does not support the client process's communication requirements, the client RMI notifies the client process of this fact [step 5150]. The client RMI might do this by throwing an Exception.

If the requested method supports the client process's communication requirements, then the client RMI selects a communication protocol that satisfies the combined communication requirements [step 5210] (FIG. 5B). Every remote method invocation made by a client to a server is performed using some underlying communication protocol. The details of the protocol can vary widely according to the type of network and the kind of security desired. Generally, the protocol will provide a virtual connection between the client and the server that provides full-duplex data communication between them.

Typically, there are several communication protocols available to the client and the server. The client RMI selects a communication protocol from among the available communication protocols that satisfies the combined communication requirements. In other words, a communication protocol is selected that meets or exceeds the combined communication requirements. If there is no protocol that satisfies the combined communication requirements, the client RMI informs the client process of this fact. The client RMI might do this by throwing an Exception.

If a communication protocol is found, the client RMI negotiates with the server using conventional mechanisms to use the selected protocol for the request, and initiates use of the protocol [step 5220]. Depending on which communication requirements the communication protocol supports, initiation of the protocol may involve such things as exchanging information, such as information to compute cryptographic keys in preparation for encrypting (for confidentiality) or information to generate checksums (for integrity); and may also involve multiple challenge-response communications to authenticate the client to the server and/or the server to the client. The client and server may also agree to keep the virtual connection open for some period of time, so that it can be reused for subsequent communications from the client to the server, including requests for the same or different methods on the server.

Once the communication protocol has been initiated, the client RMI transmits the request to server 1300 [step 5230]. When server 1300 receives the request from the client RMI, server 1300's RMI (i.e., RMI 3140 (FIG. 3)) identifies the requested method and the client's communication requirements from the request [step 6110] (FIG. 6). RMI 3140 locates the requested method in security class library 3320, and identifies the communication requirements associated with the method from the corresponding method security object [step 6120]. RMI 3140 then compares the client's communication requirements with the communication requirements stored in the method security object to determine whether the requested method supports the client's communication requirements [step 6130].

When the requested method supports the client's communication requirements, RMI 3140 determines whether the communication protocol that in use for the request supports both the client's and the requested method's communication requirements [step 6140]. If the protocol supports both sets of communication requirements, JVM 3120 invokes the requested method for the client process (i.e., grants access to the function) [step 6150].

If either the requested method does not support the client's communication requirements or the communication protocol does not support both sets of communication requirements, RMI 3140 notifies the client that the request is denied [step 6160]. In this case, RMI 3140 will record the occurrence of an unauthorized access attempt.

Suppose, for example, that a client process executing on client computer 1100 requires anonymity for an update operation of an object stored in data memory 3300 in server computer 1300. If supported bit 4142 of anonymity bits 4140 is not set for the update method, the method requires authentication of the client process before it will permit updating of the object in data memory 3300. Therefore, even if the communication protocol supports anonymity, RMI 3140 will deny the client's request because the client's communication requirements do not satisfy the client authentication requirement.

CONCLUSION

Systems and methods consistent with the principles of the present invention permit a server to designate security requirements on a per-method basis to enhance security in the servicing of requests from clients.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the exemplary computer network of FIG. 1 is for descriptive purposes only. The description and concepts contained herein equally apply to other computer networks having architectures dissimilar to FIG. 1, such as the exemplary distributed system described in copending U.S. patent application Ser. No. 09/044,944, entitled "Stack-Based Security Requirements," which was previously incorporated by reference.

Although systems and methods consistent with the present invention are described as operating in the Java programming environment, one skilled in the art will appreciate that the present invention can be practiced in other systems and other programming environments. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Sun, Sun Microsystems, the Sun logo, Java, and Java-based trademarks are trademarks or registered trademarks of Sun Microsystems Inc. in the United States and other countries.

What is claimed is:

1. A system that separately designates security requirements for each of a plurality of methods invoked on a computer, comprising:

a security class library that stores a plurality of security objects corresponding to the plurality of methods, each of the security objects storing the security requirements for the corresponding method; and an execution unit that receives from a client a method invocation request having security requirements of the client, that identifies one of the security objects in the security class library corresponding to the requested method, and that determines whether to invoke the requested method based on a comparison of the client security requirements and the security requirements stored in the one security object.

2. The system of claim 1, wherein the security requirements include a confidentiality requirement through which the computer and the client ensure privacy during communication.

3. The system of claim 1, wherein the security requirements include an integrity requirement through which the computer and the client ensure that communication remains unaltered during transmission.

4. The system of claim 1, wherein the security requirements include an anonymity requirement through which the client can remain anonymous to the computer.

5. The system of claim 1, wherein the security requirements include a server authentication requirement through which the client requests the computer to authenticate itself.

6. The system of claim 1, wherein the security requirements include a delegation requirement through which the client authorizes the computer to delegate under the client's identity.

7. The system of claim 1, wherein each of the security requirements includes bits that indicate whether the security requirement is supported or required for the corresponding method on the computer.

8. The system of claim 1, wherein the execution unit includes:

a comparison component that compares the client security requirements and the security requirements stored in the one security object.

9. The system of claim 8, wherein the execution unit further includes:

an invocation component that invokes the requested method when the client security requirements satisfy the security requirements stored in the one security object.

10. The system of claim 8, wherein the execution unit further includes:

a reporting component that reports an unauthorized request when the client security requirements fail to satisfy the security requirements stored in the one security object.

11. A system that separately designates security requirements or each of a plurality of methods invoked on a computer, comprising:

means for storing a plurality of security objects corresponding to the plurality of methods, each of the security objects storing the security requirements for the corresponding method;

means for receiving from a client a method invocation request having security requirements of the client;

means for identifying one of the security objects in the storing means corresponding to the requested method; and means for determining whether to invoke the requested method based on a comparison of the client security requirements and the security requirements stored in the one security object.

12. A computer-implemented method for granting access to a function on a computer based on security requirements associated with the function, comprising the steps of:

storing a plurality of functions in a memory on the computer;

separately designating security requirements for each of the functions;

receiving from a client a function access request having security requirements of the client;

determining the designated security requirements for the requested function;

comparing the client security requirements with the designated security requirements; and granting access to the requested function when the client security requirements satisfy the designated security requirements.

13. A computer-readable medium containing instructions for controlling a computer to perform a method that grants access to functions on the computer based on security requirements associated with the functions, the security requirements being separately designated for each of the functions, the method comprising the steps of:

receiving from a client a function access request having security requirements of the client;

determining the security requirements associated with the requested function;

comparing the client security requirements with the determined security requirements; and granting access to the requested function when the client security requirements satisfy the determined security requirements.

14. A data processing system comprising:

a memory including:
a program with methods,
a security class area that stores a different security requirement for each of the methods of the program, and
a virtual machine that receives from a remote computer a method invocation request having security requirements of the remote computer, and that invokes the requested method when the remote computer security requirements satisfy the different security requirement for the requested method in the security class area; and a processor for running the virtual machine and the program.

15. A computer-readable memory device containing a security class library data structure, the security class library data structure containing:

a plurality of security objects, each of the security objects corresponding to one of a plurality of methods stored in a device whose invocation is requested by a requestor, each of the security objects including:
a method identifier to identify the corresponding method, and a flag indicating security requirements for the corresponding method.

16. The security class library data structure of claim 15, wherein the flag includes an anonymity flag to designate whether the corresponding method supports requestor anonymity.

17. The security class library data structure of claim 15, wherein the flag includes a receiver authentication flag to designate whether the corresponding method supports device authentication.

18. The security class library data structure of claim 15, wherein the flag includes a delegation flag to designate whether the corresponding method supports delegation under the requestor's identity.

* * * * *

UNITED STATES PATENT AND TRADEMARK OFFICE
CERTIFICATE OF CORRECTION

PATENT NO. : 6,282,652 B1  
DATED : August 28, 2001  
INVENTOR(S) : Robert E. Scheifler Page 1 of 1

It is certified that error appears in the above-identified patent and that said Letters Patent is hereby corrected as shown below:

<u>Column 11,</u>
Line 60, "or each" should read -- for each --.

Signed and Sealed this

Thirtieth Day of April, 2002

*Attest:*

*Attesting Officer*

JAMES E. ROGAN  
*Director of the United States Patent and Trademark Office*